United States Patent
Lu et al.

(10) Patent No.: US 12,173,104 B2
(45) Date of Patent: *Dec. 24, 2024

(54) POROUS-POLYMER-MODIFIED METAL CARBON NANOTUBE COMPOSITE MEMBRANE, PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 514 days.

This patent is subject to a terminal disclaimer.

(21) Appl. No.: 17/555,445

(22) Filed: Dec. 18, 2021

(65) Prior Publication Data

US 2022/0177632 A1  Jun. 9, 2022

Related U.S. Application Data

(63) Continuation of application No. PCT/CN2021/074576, filed on Jan. 31, 2021.

(30) Foreign Application Priority Data

Dec. 9, 2020 (CN) .......................... 202011449869.6

(51) Int. Cl.
*C08F 291/12* (2006.01)
*B01D 67/00* (2006.01)
*B01D 69/12* (2006.01)
*B01D 71/02* (2006.01)
*B01D 71/52* (2006.01)
*C02F 1/44* (2023.01)
*C02F 101/30* (2006.01)
*C08K 3/04* (2006.01)

(52) U.S. Cl.
CPC ........ *C08F 291/12* (2013.01); *B01D 67/0083* (2013.01); *B01D 67/0088* (2013.01); *B01D 67/0093* (2013.01); *B01D 69/12* (2013.01); *B01D 71/0212* (2022.08); *B01D 71/022* (2013.01); *B01D 71/5211* (2022.08); *C02F 1/442* (2013.01); *C08K 3/041* (2017.05); *C02F 2101/308* (2013.01)

(58) Field of Classification Search
CPC .............. C08F 291/12; B01D 67/0083; B01D 67/0088; B01D 67/0093; B01D 69/12; B01D 71/0212; B01D 71/022; B01D 71/5211; B01D 69/1214; B01D 67/0006; B01D 67/0079; B01D 67/00791; B01D 71/021; B01D 71/52; B01D 69/148; C02F 1/442; C02F 2101/308; C02F 2305/08; C08K 3/041
See application file for complete search history.

(56) References Cited

U.S. PATENT DOCUMENTS

| | | | | |
|---|---|---|---|---|
| 9,827,517 | B2 * | 11/2017 | Vecitis | ............... B01D 39/2055 |
| 11,961,630 | B2 * | 4/2024 | Foley | ..................... B82Y 25/00 |
| 11,999,636 | B2 * | 6/2024 | Lu | .......................... B01D 71/60 |
| 2019/0322826 | A1 | 10/2019 | Feng et al. | |

FOREIGN PATENT DOCUMENTS

| | | |
|---|---|---|
| CN | 1530404 A | 9/2004 |
| CN | 103386258 A | 11/2013 |
| CN | 109173747 A | 1/2019 |
| CN | 109289543 A | 2/2019 |
| CN | 110272037 A | 9/2019 |

* cited by examiner

Primary Examiner — Liam J Heincer
Assistant Examiner — Zhen Liu
(74) Attorney, Agent, or Firm — SZDC Law PC

(57) ABSTRACT

A method for preparing a porous-polymer-modified metal carbon nanotube membrane includes: preparing an acidified carbon nanotube membrane; preparing a modification solution; heating the acidified carbon nanotube membrane in the modification solution and reacting to obtain a metal carbon nanotube membrane; conducting a polymerization reaction to obtain a crude polymer product; coating the metal carbon nanotube membrane with a polyethylene glycol diglycidyl ether (PEGDEG) solution; coating the metal carbon nanotube membrane with a porous polymer solution; and heating the metal carbon nanotube membrane to obtain the porous-polymer-modified metal carbon nanotube membrane. A porous-polymer-modified metal carbon nanotube membrane is prepared according to this method.

10 Claims, 2 Drawing Sheets

POROUS-POLYMER-MODIFIED METAL CARBON NANOTUBE COMPOSITE MEMBRANE, PREPARATION METHOD AND APPLICATION THEREOF

This application is a Continuation Application of PCT/CN2021/074576, filed on Jan. 31, 2021, which claims priority to Chinese Patent Application No. 202011449869.6, filed on Dec. 9, 2020, which is incorporated by reference for all purposes as if fully set forth herein.

TECHNICAL FIELD

The invention belongs to the technical field of functional materials, and particularly relates to a porous polymer-modified metal carbon nanotube composite membrane and a preparation method thereof, and its application in the purification of dye-containing wastewater.

BACKGROUND TECHNIQUE

In the textile printing and dyeing industry, the amount of dyes used is very large, and the industrial wastewater often contains variety of dyes. It has caused most water contamination. Dyes in wastewater absorb the light and reduce the transparency of water, and affect the growth of aquatic organisms and microorganisms. It is not good at self-purification of water, and even effects human's healthy seriously. There have been various processes of water purification for solution the dyes in wastewater, such as chemical oxidation, adsorption, photodegradation, biodegradation, membrane separation and so on. They have their own advantages and disadvantages. Nevertheless, it is noteworthy that the nanofiltration membrane separation method has a very broad application prospect, due to its high efficiency, low energy consumption and environmental friendliness.

Technical Problem

The object of the present invention is to provide a carbon membrane material with dye separation performance to realize its wide application in the various dyes separation, specifically a preparation method of the composite membrane and its application in the purification of dye-containing wastewater.

Technical Solutions

In order to achieve the above-mentioned object of the invention, the technical solution adopted by the present invention is:

A porous-polymer-modified metal carbon nanotube composite membrane is prepared by a method including: mixing acidified carbon nanotube film with a modification solution and then heating to react to obtain a modified carbon nanotube film; then coating the surface of the modified carbon nanotube film with polyethylene glycol, and then coating with a porous polymer solution, and heating to obtain the porous polymer-modified metal carbon nanotube composite membrane; the modification solution comprising a zirconium salt, terephthalic acid, acetic acid, and a solvent; a method of preparing the porous polymer in the porous polymer solution comprising, under nitrogen atmosphere, in the presence of anhydrous potassium carbonate, subjecting 2,3,5,6-tetrafluoroterephthalonitrile and 5,5',6,6'-tetrahydroxy-3,3',4,4'-tetramethyl-1,1'-spiralbisindan to a polymerization reaction, and after the reaction is completed, precipitating a product in methanol, and dissolving the product in chloroform, precipitating in methanol, and boiling in water to obtain the porous polymer.

The invention discloses the application of the porous-polymer-modified metal carbon nanotube composite membrane in the treatment of dye-containing wastewater. The dye-containing wastewater passes through a porous polymer-modified metal carbon nanotube composite membrane to complete the purification of the dye-containing wastewater. The dyes include congo red, rhodamine B, methyl orange, chrome black T, acid fuchsin, methyl blue and active black. Preferably, the purification of dye-containing wastewater is completed under argon pressure.

In the present invention, a carbon nanotube membrane is immersed in aqua regia for acidification to obtain the acidified carbon nanotube membrane; the coating is spin-coating or spraying.

In the present invention, the zirconium salt is zirconium tetrachloride, and the solvent is N,N-dimethylformamide; a ratio of the zirconium salt, terephthalic acid, and acetic acid is (0.1 to 0.12) g:(0.08 to 0.09) g:(8 to 8.5) ml, for example, 0.112 g:0.087 g:8.3 ml.

In the present invention, the heating is conducted at 115° C. to 125° C. for 20 to 25 hours, preferably, 120° C. for 24 hours.

In the present invention, the coating is spin-coating or spraying, and the operation is an existing method.

In the present invention, a weight ratio of anhydrous potassium carbonate:2,3,5,6-tetrafluoroterephthalonitrile:5,5',6,6'-tetrahydroxy-3,3',4,4'-tetramethyl-1,1'-spiralbisindan is (65 to 70):12:(20 to 22).

In the present invention, the polymerization reaction is conducted at 150 to 170° C. for 45 to 60 minutes; preferably, at 160° C. for 50 minutes; preferably, toluene is added every 10 minutes during the reaction.

In the present invention, the heat treatment is conducted at 110 to 130° C. for 5 to 7 hours, preferably, at 120° C. for 6 hours.

In the invention, polyethylene glycol diglycidyl is dissolved in methanol to prepare a polyethylene glycol solution, coating on the surface of the modified carbon nanotube film. Preferably, a concentration of the polyethylene glycol solution is 5 wt %. The porous polymer is dissolved in DMF, and then branched polyethyleneimine is added to prepare a porous polymer solution. Preferably, a weight of the branched polyethyleneimine was 10% of the weight of the porous polymer.

In the present invention, the metal carbon nanotube composite membrane is successfully prepared and coated with a porous polymer, realizing high efficiency nanofiltration separation of various dyes. The separation efficiency tested on various dyes reaches at 90%, or higher. The composite membrane has suitable pore size and porosity required for separation. The polymer coating mainly functions to enhance the stability and durability of the membrane, and solves the crystal defects that may occur during the metal growth process. In addition, the membrane material is easy to manufacture, has a wide range of separation applicability, and had great application potential.

DETAILED DESCRIPTION

Figure 1:
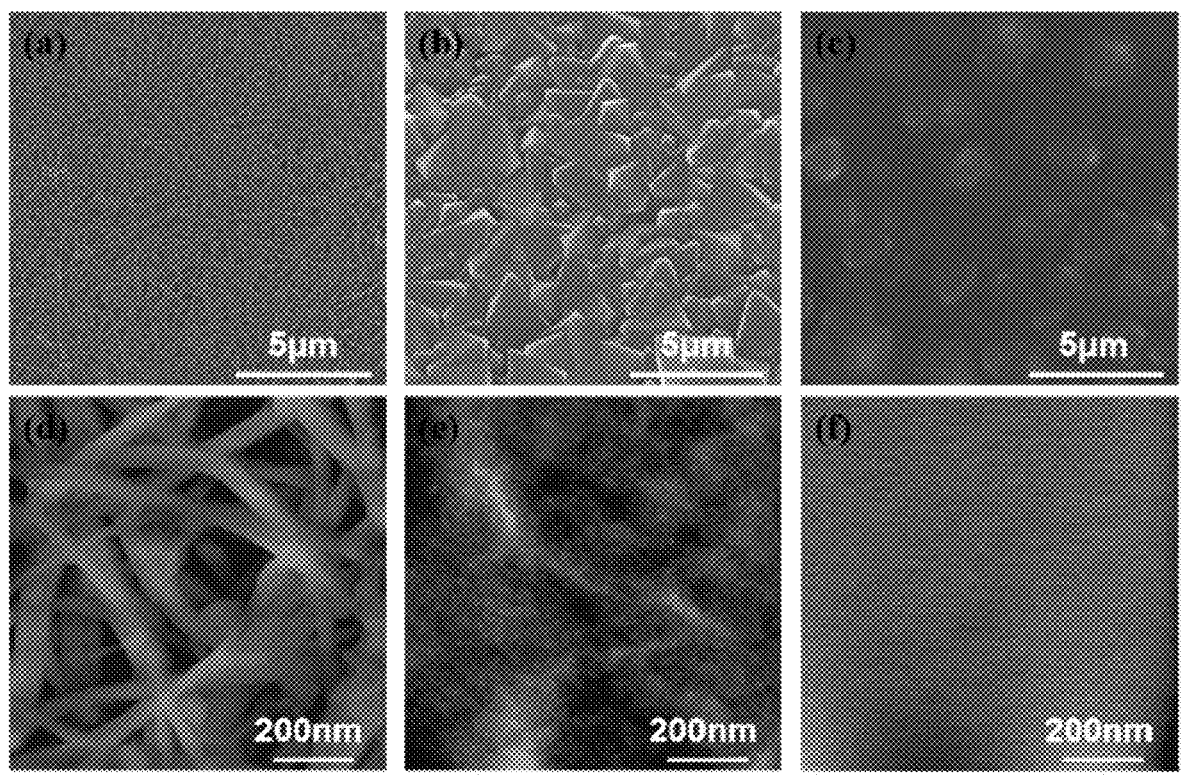
FIG. 1 shows the scanning electron microscope images and an atomic force microscope images of the MWCNT film before and after modification.

The raw materials used in the present invention are all commercially available products, and the specific preparation operations and testing methods are all conventional methods in the field.

Example 1 Preparation of Porous-Polymer-Modified Metal Carbon Nanotube Composite Membrane The specific steps are as follows:
(1) Synthesis of modified multi-walled carbon nanotube (MWCNT) film. First, mixed 30 ml of concenrated hydrochloric acid and 10 ml of concentrated nitric acid were mixed with the volume ratio of 3:1 to prepare aqua regia. A MWCNT film was placed into aqua regia and soaked at 50° C. for 6 hours for acidification. The acidified MWCNT film was washed with ultrapure water and dried. Accurately weighing 0.112 g of zirconium tetrachloride and 0.087 g of terephthalic acid, dissolving them in 60 ml of N,N-dimethylformamide (DMF), and then sonicating for 20 minutes, then adding 8.3 ml of acetic acid to obtain a mixture. The mixture and the acidified dried MWCNT film (10*10 cm$^2$) were transferred to a 100 ml stainless steel autoclave, heated at 120° C. for 24 hours, after natural cooling, washed with DMF and methanol. Finally, it was dried at 60° C. for 12 hours to obtain a modified metal MWCNT film;
(2) Preparation of porous polymer. Weighing 12.0 g of 2,3,5,6-tetrafluoroterephthalonitrile and placing it in a dry three-necked flask. Under N$_2$ atmosphere, adding 50 ml of DMF, and then weighing 20.4 g of recrystallized 5,5',6,6'-tetrahydroxy-3,3',4,4'-tetramethyl-1,1'-spiralbisindan (TTSBI), adding to a flask and stir to dissolve; then adding 67.0 g of anhydrous potassium carbonate, stirring well, heating the reaction in oil bath at 160° C.; during this period, adding 5 ml of anhydrous toluene to the reaction every 10 minutes, stopping the reaction after 50 minutes; cooling to room temperature, pouring the product into 600 ml of methanol, and precipitating was precipitated. The precipitate was dissolved in 100 ml of chloroform, and after complete dissolution, pouring 500 ml of methanol to precipitate, filtering the precipitate, and repeating the dissolution/precipitation operation 4 times to obtain a fluorescent yellow precipitate finally. The obtained precipitate was cut into small pieces, placed in ultrapure water, boiled for 5 hours, filtered, washed with ultrapure water and ethanol, repeated three times, placed in a vacuum oven at 80° C., and dried for 12 hours to obtain 15.1 g of yellow solid, i.e., a porous polymer;
(3) Preparation of composite membrane. Dissolving 1.0 g of polyethylene glycol diglycidyl ether (PEGDEG) in 19 g of methanol to prepare Solution 1 with 5 wt % PEGDEG. The Solution 1 was evenly spin-coated on the metal-loaded modified MWCNT film, and dried at room temperature to obtain polyethylene glycol modified film. Dissolving 1.0 g of porous polymer in 20 ml of DMF, then adding 0.1 g of branched polyethyleneimine (PEI) to prepare Solution 2; spraying the Solution 2 evenly on the polyethylene glycol modified film, then putting it in an oven and heated it at 120° C. for 6 hours to obtain a composite film product.

In FIG. 1, (a) and (d) are unmodified MWCNT films, (b) and (e) are modified metal MWCNT films, and (c) and (f) are modified metal MWCNT films (composite films) coated with porous polymers; metals and porous polymers are visible. All have been successfully modified on the MWCNT film.

Seven typical dye solutions were prepared by conventional methods. Adding congo red, rhodamine B, methyl orange, chrome black T, acid fuchsin, methyl blue, and reactive black into 100 ml of water to prepare a single-component solution with the concentration of 100 ppm, i.e., dye-containing wastewater, used in the following tests.

According to the normal operation, the membrane was fixed in the high-pressure stirring tank of filter equipment Sterlitech HP4750, pouring a corresponding dye solution, and adding argon gas to pressurize to 3.0 bar, under pressure, purifying the dye wastewater. The specific operation follows normal procedures.

Figure 2:
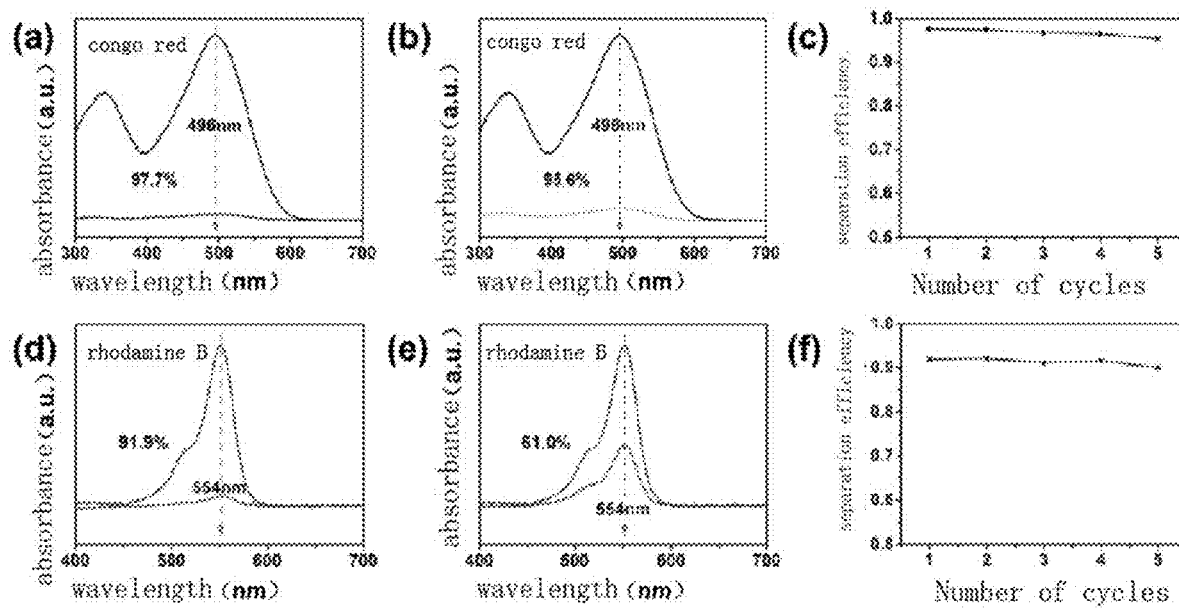
FIG. 2 shows diagrams of the dye separation efficiency of different membranes.

Example 2 Control Experiment of the Dye Separation Efficiency of the Modified Metal MWCNT Membrane Before and After Coating with the Porous Polymer FIG. 2 shows the separation experiment of two single-component dye solutions to compare the separation efficiency of the membrane before and after coating with porous polymer. FIG. 2(a) shows the separation efficiency of Congo red by the composite membrane modified with porous polymer; 2(b) shows the separation efficiency of modified metal MWCNT membrane for Congo red, 2(c) shows the recycling separation efficiency of Congo red solution by composite membrane coated with porous polymer; 2(d) shows the separation efficiency for Rodin by composite membrane with porous polymer; 2(e) shows the separation efficiency rhodamine B by the modified metal MWCNT membrane; 2(f) shows the recirculation separation efficiency for the rhodamine B solution by the composite membrane coated with porous polymer.

The separation efficiency of the modified metal MWCNT membrane was 95.6% (Congo Red) and 61.0% (Rhodamine B), and the separation efficiency of the composite membrane coated with porous polymer was 97.7% (Congo Red) and 91.9% (Rhodamine B). The separation efficiency of the composite membrane coated with porous polymer was significantly improved.

In addition, the separation efficiency of the acidified MWCNT membrane for rhodamine B was 42.3%, and the separation efficiency of the polyethylene glycol modified membrane for rhodamine B was 63.7%.

At the same time, the cyclic separation efficiency of two dye solutions was tested. After one separation, the membranes were washed with water, dried and then separated again; after 5 cycles, the separation efficiency of the composite membrane modified with porous polymer on Congo red was above 95%, the separation efficiency of rhodamine B was still above 90%, indicating that the composite membrane coated with porous polymer can be continuously used for separation. A membrane material for dye separation has been successfully prepared.

Control Example

Based on Example 1, the Solution 2 was uniformly sprayed on the modified MWCNT film loaded with metal, that is, without polyethylene glycol modification. Other conditions were the same. The obtained composite film has 88.2% of the separation efficiency for rhodamine B. The separation efficiency for second separation dropped to 85.1%, and the third to 75.9%.

Based on Example 1, heating at 120° C. for 6 hours was modified to heating at 120° C. for 10 hours. Other conditions were the same. The obtained composite membrane separation efficiency was 85.7% with rhodamine B.

Based on Example 1, the preparation of the porous polymer was adjusted from 160° C. for 50 minutes to 140° C. for 3 hours. Other conditions were the same. The obtained composite membrane separation efficiency was 83.1% with rhodamine B Based on Example 1, heating at 120° C. for 24 hours was modified to 150° C. for 15 hours Others are the same. The obtained composite membrane separation efficiency was 79.6% with rhodamine B.

Example 3 Dye Separation Performance Test of Composite Membrane Coated with Porous Polymer The separation efficiency of the composite membrane for dyes of different molecular weights was tested. The results show that the separation efficiency of the membrane for various dyes with molecular weighted ranging from 200 to 1300 was all above 90%, indicating that the separation performance of the composite membrane had a wide range of applicability. In addition, chrome black T was selected as the dye for the test film cycle performance experiment. After 10 cycles, the separation efficiency of chrome black T decreased from 98% to 96%, and the separation flux remained above 40 L m$^{-2}$ s$^{-1}$ MPa$^{-1}$, indicating that the composite membrane coated with porous polymer can effectively operate a variety of separations.

Figure 3:
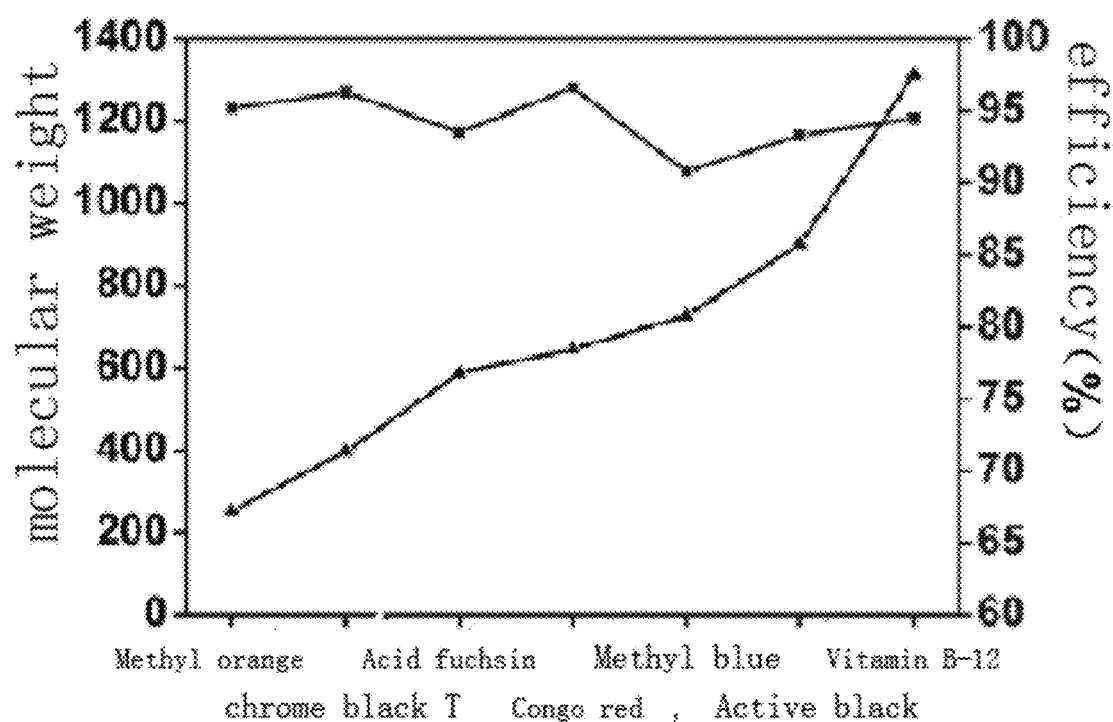
FIG. 3 shows the result of the separation efficiency with different molecular weight of dyes.
Figure 4:
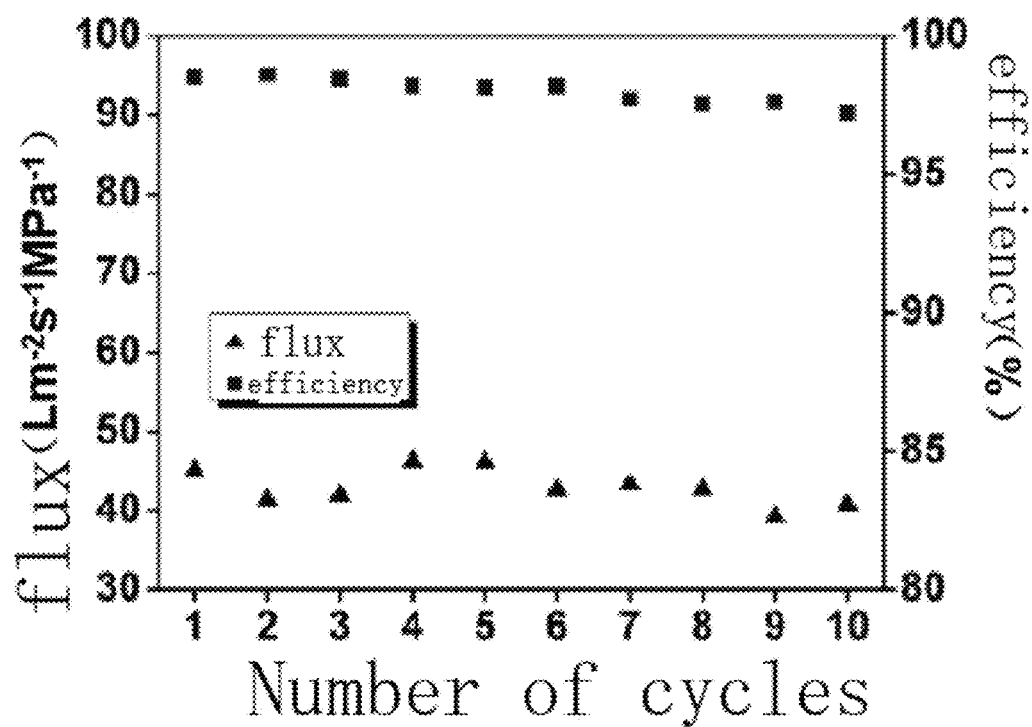
FIG. 4 shows the result of the recycling separation efficiency and flux of chrome black T.

FIG. 3 shows the result of the separation efficiency with different molecular weight of dyestuff; FIG. 4 shows the result of the recycling separation efficiency and flux of chrome black T.

Summary: In the present application, a composite membrane coated with a porous polymer was successfully prepared, and a high efficiency nanofiltration separation of a variety of dyes was achieved. The separation efficiency of various dyes tested reached 90% or higher. The composite membrane coated with porous polymer has the appropriate pore size and porosity required for dye separation, and the membrane has good stability and durability, and solves the problem of metal Crystal defects that may appear during the growth process. In addition, the membrane material is easy to manufacture, has a wide range of dye separation applicability, and has great application potential.

The invention claimed is:

1. A method for preparing a porous-polymer-modified metal carbon nanotube membrane, comprising:
    immersing a carbon nanotube membrane in aqua regia for acidification to obtain an acidified carbon nanotube membrane;
    preparing a modification solution that includes a zirconium salt, terephthalic acid, acetic acid, and a solvent;
    heating the acidified carbon nanotube membrane in the modification solution and reacting to obtain a metal carbon nanotube membrane;
    conducting a polymerization reaction of 2,3,5,6-tetrafluoroterephthalonitrile and 5,5',6,6'-tetrahydroxy-3,3',4,4'-tetramethyl-1,1'-spiralbisindan, under nitrogen atmosphere and in the presence of anhydrous potassium carbonate, to obtain a crude polymer product;
    precipitating the crude polymer product in methanol, dissolving the crude product in chloroform, precipitating the crude polymer product in methanol, and heating the crude polymer product in water to obtain a porous polymer;
    preparing a polyethylene glycol diglycidyl ether (PEGDEG) solution and coating the metal carbon nanotube membrane with the polyethylene glycol diglycidyl ether solution;
    preparing a porous polymer solution and coating the metal carbon nanotube membrane with the porous polymer solution; and
    heating the metal carbon nanotube membrane to obtain the porous-polymer-modified metal carbon nanotube membrane.

2. The method of claim 1, wherein for the modification solution, the zirconium salt is zirconium tetrachloride; the solvent is N,N-dimethylformamide; and a ratio of the zirconium salt, terephthalic acid, and acetic acid is (0.1 to 0.12) g:(0.08 to 0.09) g:(8 to 8.5) ml.

3. The method of claim 1, wherein a weight ratio of anhydrous potassium carbonate:2,3,5,6-tetrafluoroterephthalonitrile:5,5',6,6'-tetrahydroxy-3,3',4,4'-tetramethyl-1,1'-spiralbisindan is (65 to 70):12:(20 to 22).

4. The method of claim 1, wherein the polyethylene glycol diglycidyl ether solution is a methanol solution that includes 5 wt % of polyethylene glycol diglycidyl ether.

5. The method of claim 1, wherein the porous polymer solution is an N,N-dimethylformamide (DMF) solution that includes 0.05 g/ml of the porous polymer and 0.005 g/ml of branched polyethyleneimine (PEI).

6. The method of claim 1, wherein the acidified carbon nanotube membrane is heated in the modification solution at 115° C. to 125° C. for 20 to 25 hours.

7. The method of claim 1, wherein the polymerization reaction is conducted at 150° C. to 170° C. for 45 to 60 minutes.

8. The method of claim 1, wherein the metal carbon nanotube membrane is heated at 110° C. to 130° C. for 5 to 7 hours to obtain the porous-polymer-modified metal carbon nanotube membrane.

9. The method of claim 1, wherein the coating the metal carbon nanotube membrane with the polyethylene glycol diglycidyl ether (PEGDEG) solution is spin-coating or spraying; and the coating the metal carbon nanotube membrane with the porous polymer solution is spin-coating or spraying.

10. A porous-polymer-modified metal carbon nanotube membrane prepared according to the method of claim 1.

* * * * *